United States Patent Office 3,816,432
Patented June 11, 1974

3,816,432
PRODUCTION OF VINYL SUBSTITUTED AROMATICS FROM METHYL SUBSTITUTED AROMATICS
Raymond A. Franz, Kirkwood, Mo., assignor to Monsanto Company, St. Louis, Mo.
No Drawing. Filed Jan. 15, 1969, Ser. No. 791,489
Int. Cl. C07d 31/20
U.S. Cl. 260—290 V          9 Claims

ABSTRACT OF THE DISCLOSURE

Vinyl substituted aromatic compounds are produced in a non-catalytic process by contacting a methyl substituted aromatic compound with methyl chloride or methylene chloride. The contacting is carried out at a temperature of from about 700 to about 950° C. at a pressure of not more than four atmospheres absolute.

BACKGROUND OF THE INVENTION

This invention relates to a method for making vinyl substituted aromatic compounds from methyl substituted aromatic compounds. More particularly, this invention relates to a non-catalytic process for producing vinyl substituted aromatic compounds by contacting a methyl substituted aromatic compound with methyl chloride or methylene chloride in a thermal reaction zone.

During the past few years vinyl substituted aromatic compounds such as styrene have become important materials for producing various polymers. Such polymers can range from the rubbery butadiene and styrene type co-polymers to the rigid resinous polystyrene plastic materials. Since polymers, containing vinyl substituted aromatic compounds, are being used in increased quantities, there is a need for new and improved methods for making vinyl substituted aromatic monomers.

Currently, styrene is made in commercial quantities by reacting ethylene with benzene, in the presence of a suitable catalyst to form ethylbenzene. The ethylbenzene must then be dehydrogenated to produce styrene. Since benzene is an expensive starting material, it is evident that methods for making styrene using cheaper starting materials, such as toluene, would be valuable contributions to the art.

In view of the desirability of making vinyl substituted aromatic compounds from readily available starting materials, I have developed a new process for making vinyl substituted aromatic compounds from methyl substituted aromatic compounds.

SUMMARY OF THE INVENTION

Briefly stated, my invention comprises a simple one-step process wherein a methyl substituted aromatic compound is contacted with a chloromethane compound such as methyl chloride or methylene chloride at a temperature of from about 700 to 950° C. The contacting is carried out at a pressure of up to four atmospheres absolute.

It is the object of my invention to provide a new method for making monomeric vinyl substituted aromatic compounds. Another object of my invention is to provide a process for making styrene from toluene in a simple one-step process. A further object of my invention is to provide a thermal process for producing monomeric styrene at relatively low temperatures and pressures, without the concurrent production of polystyrene.

Other objects, advantages and features of my invention will be apparent to those skilled in the art upon examination of the following disclosure and the claims.

DESCRIPTION OF PREFERRED EMBODIMENTS

My invention is directed to the production of monomeric vinyl substituted aromatic compounds from methyl substituted aromatic compounds. According to my invention, monomeric vinyl substituted aromatic compounds are produced in significant quantities by contacting a methyl substituted aromatic compound with methyl chloride, methylene chloride or mixtures of methyl chloride and methylene chloride in a thermal reaction zone. The contacting is carried out at a temperature of from about 700 to about 950° C. The most preferred temperature range is from about 800 to about 900° C. I have found that temperatures of below 700° C. will produce little vinyl substituted aromatic monomer, even when the contact times are prolonged. While styrene can be produced above 950° C., when the methyl substituted compound is toluene, problems are encountered by excessive polymerization of the styrene in the reaction vessels and transfer lines. I have also found that temperatures of above 950° C. tend to increase the production of by-product materials that are less valuable than monomeric styrene and monomeric vinyl naphthalene. This of course decreases the yield of vinyl substituted aromatic compound based on the amount of methyl substituted aromatic compound converted in the reaction.

The pressure that is employed in contacting the methyl substituted aromatic compound with methyl chloride or methylene chloride or mixtures thereof, according to my invention should be no greater than four atmospheres absolute. There is no minimum limit on the pressure that can be employed in my invention. I have found that pressures above four atmospheres absolute tend to produce increased amounts of such materials as ethylbenzene and ethylnaphthalene, with a corresponding decrease in the monomeric styrene and monomeric vinyl naphthalene production.

The time for contacting the reactants according to my invention can vary from about 0.01 second to about 60 seconds. The most preferred contact time is from about 0.1 second to about 20 seconds. The contact time is somewhat dependent upon the reaction temperature, with longer contact times being required as the reaction temperature is decreased.

The mol ratios of methyl substituted aromatic compound to total chloromethane compound is in the range of about 2:1 to about 1:10. The most preferred mol ratios are from about 1:1 to about 1:5.

Methyl chloride is the preferred chloromethane compound that is used in my invention.

The methyl substituted aromatics utilized in my invention are hydrocarbons having a benzene or naphthalene nucleus with at least one methyl substituent and methyl substituted pyridines. Examples of useful methyl substituted aromatic compounds are toluene, 1-methyl naphthalene, 2-methyl naphthalene, 2-methyl pyridine, 3-methyl pyridine and 4-methyl pyridine. When toluene is utilized in my invention styrene is produced. Vinyl naphthalene is produced when the methyl naphthalenes are used. Vinyl pyridines are produced when methyl substituted pyridines are used as reactants. The methyl substituted aromatic hydrocarbons are the preferred reactants in my invention. Toluene is the most preferred reactant material of my invention.

In carrying out my invention, it may be desired in some instances to utilize an inert diluent such as nitrogen, helium, and the like. Whenever a diluent is used however, the conversion of methyl substituted aromatic compound into the desired monomeric vinyl substituted aromatic compound is usually decreased at a given reaction temperature and contact time.

Any suitable reactor can be utilized, so long as the temperature, pressure and residence times set forth above are met. One such desirable reactor is a tubular reactor. The tubular reactor can be constructed of any suitable material.

It is preferred that the reactant materials be preheated and vaporized and thoroughly mixed prior to charging them to the reactor. I generally prefer to preheat the vaporized reactants and mix them at a temperature of at least about 300° C. prior to charging them to the reactor. In some instances, the reactor and preheater may be packed with known inert packing materials to aid in heat transfer of heat to the reactant materials flowing through the preheater and reactor. The packing also improves mixing of the reactants in the preheater and reactor.

It is necessary to rapidly quench the effluent from the reactor to prevent undesirable side reactions and undesirable thermal polymerization of the vinyl substituted aromatic compound in the effluent. This rapid quenching can be carried out in any manner known to those skilled in the art.

Monomeric vinyl substituted aromatic compounds can be recovered from the quenched reactor effluent and purified according to known purification techniques.

Styrene made according to my invention has utility in the production of polymeric materials such as butadiene and styrene rubber and resinous polystyrenes that can be shaped and formed into various articles.

Unreacted toluene, recovered from the reactor effluent can be recycled to the reactor for further reaction.

In order to further illustrate my invention, the following examples are presented. It is understood that the conditions, proportions and operating techniques set forth in these examples are illustrative only and should not be construed to unduly limit my invention.

EXAMPLE I

A series of runs was carried out utilizing a tubular glass reactor that was heated with a heating coil wrapped around the reaction zone. A preheat zone was fitted into the reactant transmission line adjacent the inlet to the reactor. A thermocouple was passed through the outlet end of the reaction zone to sense the temperatures in the center of the reaction zone. The reactor and the preheat section were packed with 12 to 20 mesh quartz chips. Toluene and methyl chloride were passed into the preheat section of the apparatus where both reactants were vaporized and thoroughly mixed. The vaporized reactants were preheated to a temperature of approximately 300° C. in the preheat section of the apparatus. The effluent from the reaction zone was cooled by passing it through a water-cooled condenser section followed by a series of U-tube condensers, cooled in a Dry Ice bath, wherein the reaction products were recovered. The runs were carried out at atmospheric pressure.

The residence time of the reactants in the reaction zone was 0.1 second. The following table gives the amounts of reactants charged per unit time, reaction temperatures, percent of toluene converted and the percent yield of styrene calculated by mols of styrene obtained per unit time divided by mols of toluene converted per unit time multiplied by 100:

TABLE I

| Run | A | B | C | D |
|---|---|---|---|---|
| Toluene charged, mols | 1 | 1 | 1 | 1 |
| Methyl chloride charged, mols | 1 | 1 | 5 | 5 |
| Reaction temperature, ° C | 805 | 875 | 875 | 905 |
| Toluene conversion, percent | 14 | 16 | 15 | 51 |
| Yield of styrene, percent | 55 | 60 | 79 | 49 |

The above data show the production of styrene in high yields based on amount of toluene converted.

EXAMPLE II

Another series of runs was carried out utilizing the same procedure and apparatus described in Example I, except that the residence time of the reactants in the reaction zone was one second. The following table gives the amounts of reactants charged per unit time, reaction temperatures, percent of toluene converted and the percent yield of styrene calculated by mols of styrene obtained per unit time divided by mols of toluene converted per unit time multiplied by 100:

TABLE II

| Run | A | B | C | D |
|---|---|---|---|---|
| Toluene charged, mols | 1 | 1 | 2 | 2 |
| Methyl chloride charged, mols | 2 | 2 | 1 | 1 |
| Reaction temperature, ° C | 800 | 850 | 800 | 850 |
| Toluene conversion, percent | 2 | 6 | 2 | 6 |
| Yield of styrene, percent | 47 | 47 | 31 | 34 |

EXAMPLE III

Another series of runs was carried out utilizing the same procedure and apparatus described in Example I, except that the residence time of the reactants in the reaction zone was ten seconds. The following table gives the amounts of reactants charged per unit time, reaction temperatures, percent of toluene converted and the percent yield of styrene calculated by mols of styrene obtained per unit time divided by mols of toluene converted per unit time multiplied by 100:

TABLE III

| Run | A | B | C | D |
|---|---|---|---|---|
| Toluene charged, mols | 1 | 1 | 1 | 1 |
| Methyl chloride charged, mols | 1 | 1 | 5 | 5 |
| Reaction temperature, ° C | 750 | 800 | 750 | 800 |
| Toluene conversion, percent | 5 | 19 | 13 | 22 |
| Yield of styrene, percent | 39 | 22 | 51 | 30 |

EXAMPLE IV

A series of runs was carried out utilizing the procedure and apparatus of Example I with the following exceptions. In this series of runs, methylene chloride and toluene were reacted to produce styrene. The toluene charges to the reactor contained approximately 400 p.p.m. benzenethiol. The residence time of the reactants in the reaction zone was one second. The following table gives the amounts of reactants charged per unit time, reaction temperatures, percent of toluene converted and the percent yield of styrene calculated by mols of styrene obtained per unit time divided by mols of toluene converted per unit time multiplied by 100:

TABLE IV

| Run | A | B | C |
|---|---|---|---|
| Toluene charged, mols | 1 | 1 | 1 |
| Methylene chloride charged, mols | 1 | 1 | 1 |
| Reaction temperature, ° C | 750 | 800 | 850 |
| Toluene conversion, percent | 3 | 33 | 45 |
| Yield of styrene, percent | 37 | 48 | 17 |

EXAMPLE V

A series of runs is carried out to make 4-vinyl pyridine from 4-methyl pyridine using the procedure and apparatus of Example I. The following table gives the amounts of reactants charged per unit time and reaction temperatures for the runs:

TABLE V

| Run | A | B |
|---|---|---|
| 4-methyl pyridine charged, mols | 1 | 1 |
| Methyl chloride charged, mols | 3 | 0 |
| Methylene chloride charged, mols | 0 | 3 |
| Reaction temperature, ° C | 875 | 875 |

4-vinyl pyridine is recovered from the reaction products of both runs in yields of over 25 percent based on the 4-methyl pyridine converted with over 10 percent conversion of the 4-methyl pyridine charged.

It will be apparent to those skilled in the art from the above disclosure that various modifications can be made in my invention without departing from the spirit or scope thereof.

I claim:

1. A process for producing vinyl substituted aromatic compounds which comprises contacting in the absence of a diluent a methyl substituted aromatic compound selected from benzene having at least one methyl substituent, naphthalene having at least one methyl substituent and pyridine having at least one methyl substituent with at least one chloromethane compound selected from the group consisting of methyl chloride and methylene chloride at a temperature of from about 700 to about 950° C. and at a pressure of not more than about four atmospheres absolute.

2. The process of claim 1 wherein the mol ratio of methyl substituted aromatic compound to chloromethane compound is from about 1:10 to about 2:1.

3. The process of claim 2 wherein said contacting is for a period of from about 0.01 second to about 60 seconds.

4. The process of claim 3 wherein said contacting is at a temperature of from about 800 to about 900° C.

5. The process of claim 4 wherein said methyl substituted aromatic compound is selected from the group consisting of toluene, 1-methyl naphthalene and 2-methyl naphthalene.

6. The process of claim 5 wherein said chloromethane is methyl chloride.

7. The process of claim 6 wherein said methyl substituted aromatic compound is toluene.

8. The process of claim 7 wherein the mol ratio of toluene to methyl chloride is from about 1:5 to about 1:1 and said contacting is carried out for a period of from about 0.1 second to about 20 seconds.

9. The process of claim 4 wherein said methyl substituted aromatic compound is selected from the group consisting of 2-methyl pyridine, 3-methyl pyridine and 4-methyl pyridine.

References Cited
UNITED STATES PATENTS 3,494,969   2/1970   Kallos _____ 260—669

HARRY I. MOATZ, Primary Examiner

U.S. Cl. X.R.

260—669 R